May 28, 1968 E. GATTI ET AL 3,386,090

METHOD OF IMPROVING THE DIFFERENTIAL LINEARITY OF ANALOG-DIGITAL CONVERTERS AND APPARATUS EQUIPMENT FOR IT

Filed June 11, 1964

United States Patent Office 3,386,090

Patented May 28, 1968

3,386,090

METHOD OF IMPROVING THE DIFFERENTIAL LINEARITY OF ANALOG-DIGITAL CONVERTERS AND APPARATUS EQUIPMENT FOR IT

Emilio Gatti, Lesmo, and Vito Svelto and Carlo Cottini, Milan, Italy, assignors to Cise—Centro Informazioni Studi Esperienze, Segrate, Milan, Italy, a company of Italy Filed June 11, 1964, Ser. No. 374,476

Claims priority, application Italy, July 1, 1963, Patent 699,271

1 Claim. (Cl. 340—347)

ABSTRACT OF THE DISCLOSURE

Apparatus for improving differential linearity in analog-to-digital conversion of a succession of signal pulses by a quantitized trial-and-error. The apparatus comprises an analog-to-digital converter adapted to receive the aforesaid succession of pulses, a comparator, and a comparator discriminator adapted to receive the aforesaid succession of pulses, a digital adder, and a circuit having a voltage output which changes in amplitude by a preselected value for each input pulse and a digital output, which is a measure of the voltage output, the comparator discriminator including an output coupled to the aforesaid circuit, the voltage output being coupled to the comparator and the digital output being coupled to the digital adder to which the output of the analog-to-digital converter is coupled. The output of the digital adder constitutes a digital measure of the input signal.

Figures 1, 2:
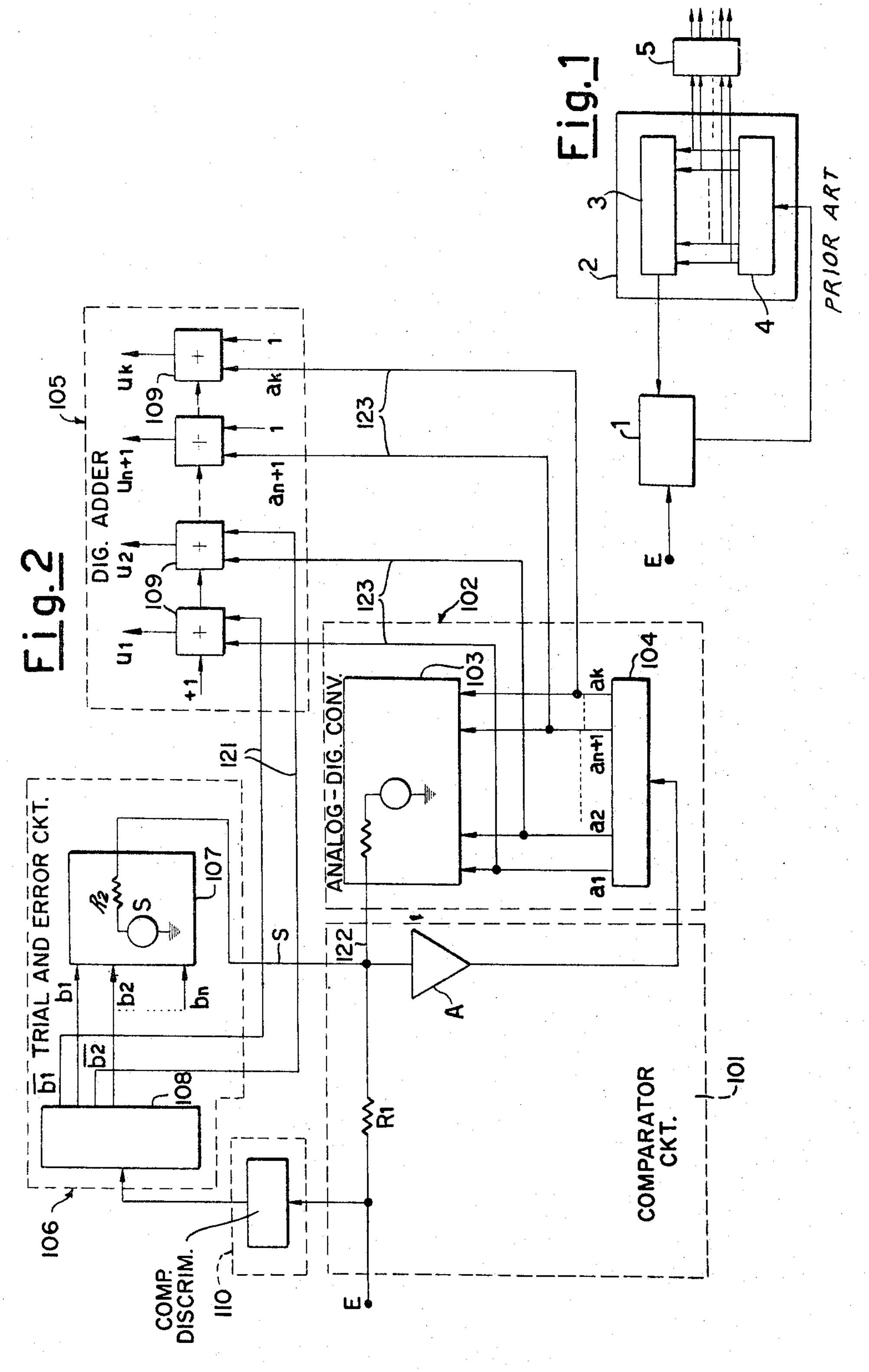

The present invention relates to apparatus wherein a signal of digital form is derived from an analog signal by a quantitized trial-and-error sampling process, as used, for example, with pulse analyzers for nuclear physics, with digital voltmeters, with data recorders and the like, and particularly concerns a method for improving the differential linearity of the process of converting to digital signals. Such apparatus, generally referred to as analog-to-digital converters, samples incoming signals at discrete intervals and then codes each sample in digital form according to a series of discrete, or quantitized levels.

Provided that the noise level is maintained less than the quantitizing step, i.e., the difference between successive quantitized levels, the error then occurring in the system for a particular sample is confined to within the value of one quantitizing step.

Errors in the measurement of analog signals are usually expressed in terms of the value of the measured signal, i.e., they are expressed as proportional errors having the numerical value $\epsilon_{K/K}$, where $\epsilon K$ is the actual error which has occurred, and K is the value of the signal.

In the quantitized sampling system, the errors which result in incorrect coding are threshold errors in the quantitized levels K, $K+1$, etc. and may be expressed $\epsilon_K$, $\epsilon_{K+1}$. The differential error is then provided by the expression $$\epsilon_{K+1}-\epsilon_K$$

It will be noted that the differential error has an order of magnitude K times larger than the relative inaccuracies in the value of the levels.

Stated otherwise, the differential error $\epsilon_{K+1}-\epsilon_K$ has the same order of magnitude as the error $\epsilon_K$ and the relative inaccuracies in the values of the levels are $\epsilon_{K/K}$; therefore it is clear that the differential error $\epsilon_{K+1}-\epsilon_K$ has an order of magnitude K times larger than the relative inaccuracies in the value of the levels.

The present invention is concerned with minimizing the influence of the value $\epsilon_{K+1}-\epsilon_K$ and the method chosen is to classify the sample according to contiguous pairs of levels $K+S$, $K+S+1$ instead of the appropriate levels K, $K+1$. Accordingly the differential error becomes:

$$\epsilon_{K+S+1}-\epsilon_{K+S}$$

Now the effective differential error resulting during the classification of a set of samples will be the average of the differential errors for each pair of levels utilized and if each one, accordingly, is used an equal number of times, the effective error is given by:

$$\frac{1}{M+1}\epsilon_0{}^M(\epsilon_{K+S+1}-\epsilon_{K+S})$$

or $$\epsilon_{eff}=\frac{1}{M+1}(\epsilon_{K+M+1}-\epsilon_K)$$

when M is the number of pairs of levels utilized.

According to the invention, therefore, there is provided a method of improving the differential linearity in the conversion of an analog to digital signal by a quantitized trial-and-error sampling process, whereby each sample in a succession of samples is classified and coded according to a contiguous pair of quantitized levels selected from a determined spectrum of levels having the relationship with reference to the analog signal of $$K+S \text{ and } K+S+1$$

where K is a weight signal representing the next lowest quantitized level to the analog signal, and S is an auxiliary-weight signal selected in relation to the analog signal according to a casual or a sequential law, and whereby the auxiliary weight is subsequently removed from the digital signal by a numerical method.

The invention will be further described with reference to an analog-to-digital converter embodying a trial-and-error circuit operable in accordance with the method of invention, and with reference to the attached drawing wherein:

FIGURE 1 is a block diagram of a conventional trial-and-error analog-to-digital converter; and FIGURE 2 is a block diagram of a trial-and-error analog-to-digital converter similar to that of FIGURE 1, but adapted to function according to the method of the invention. The blocks, therein, generally perform the functions of the blocks outlined in FIGURE 1 anotated by identical numbers.

Referring initially to FIGURE 1, in comparator 1 successive samples E are compared wtih quantitizing signals generated by the trial-and-error calculator 2.

A difference signal is fed back to the trial-and-error calculator 2 wherein it acts on a control circuit 4 to adjust the quantitizing level until it is within one quantitizing step of the input signal. The output from the control circuit, which is in coded form and is generated by a sequential logic circuit, passes to a register 5 which then provides the digital output signal, read-out or record.

Decoding circuit 3 under the influence of the control circuit 4 provides the series of quantitized signals for comparison with the sample.

The embodiment according to the invention is similarly arranged, as is illustrated in FIGURE 2. However, an auxiliary trial-and-error circuit 106 receives the comparator output 10 and provides an auxiliary weighting signal S which is summed with the input signal E and the decoded quantized level signal in the decoding circuit 103 in the comparator circuit 101 (e.g., a comparator amplifier with a virtual ground), the unbalance signal therefrom being applied to the control circuit 104.

Circuit 106 comprises a sequential logic control circuit 108 and a decoding circuit 107. The output from the decoding circuit is summed in the comparator circuit 101 as aforesaid. The output from the control circuit 108 operates on the decoding circuit 107 and also provides a digital input 121, for the purpose of removing the weighting signal S, to the register 105.

In register 105 there is provided a plurality of adding blocks 109. These sum differentially the main weights provided by the control circuit 104 comprising bit $a_1, a_2 \ldots a_{n+1}, a_k$ to the auxiliary weights provided by the control circuit 108 comprising bit $\bar{b}_1, \bar{b}_2 \ldots \bar{b}_n$ (this being the complementary form of bit $b_1, b_2 \ldots b_n$) and deliver the final coded outputs, representative of the input E, bit $u_1, u_2 \ldots u_{n+1}, u_k$.

By way of information and explanation it is mentioned that references to the various devices described above are, to be found in the following literature:

The blocks 102 and 106 are described by B. D. Smith, in "Coding by Feed-Back Methods," Pire, 1053 (1953); the block 110 is a normal comparator discriminator circuit, for instance a Schmitt discriminator to be found in any text book of Electronics, for instance: Millman and Taub, "Pulse and Digital Circuits," McGraw-Hill; the block 105 includes adding blocks 109 such as those described for instance in: H. D. Ross, Jr., "The Arithmetic Element of the IBM Type 701 Computer," Pire 1287 (1953).

The operation of the embodiment is described in greater detail hereinafter, with further reference to FIGURE 2. To the input signal E and the main weight delivered at the comparator amplifier A is added a negative auxiliary weight in the range O to —M, having errors $\sigma_0, \sigma_1, \sigma_2 \ldots \sigma_M$, which is sequentially or randomly varied with successive samples to be in predetermined relationship with the input signals.

For example, suppose the input E is a pulse of amplitude $(k+\frac{1}{2})$ and that the auxiliary trial-and-error circuit 106 is delivering a weight of $-S$. The comparator circuit 101 will be unbalanced in one direction by a weight of $(K+S)-S$ and in the other direction by a weight of $K+(S+1)-S$, and the main trial-and-error circuit 102 delivers the weight $K+S$. The boundaries of the level are therefore:

$$K+S+\epsilon_{K+S}-S-\sigma_S$$
$$K+S+1+\epsilon_{K+S+1}-S-\sigma_S$$

whence the differential linearity is:

$$\epsilon_{K+S+1}-\epsilon_{K+S}$$

For a succession of quantitizing operations, e.g. around the sample size $(K+\frac{1}{2})$, the effective differential linearity is the average of all the values for values of S between O and M, and is given by the previously mentioned expression $\epsilon_{eff}$. Assuming $\epsilon_{K+S+1}$ and $\epsilon_{K+S}$ are errors of the same order of magnitude, the advantage in the method of the invention is in the ratio $M+1:1$.

What is claimed is:

1. Apparatus for improving differential linearity in analog-to-digital conversion of an input signal including a succession of signal pulses by quantized trial-and-error, said apparatus comprising an analog-to-digital converter producing a decoded quantitized level signal output and a digital output, a comparator circuit, producing an output signal which is transmitted to said analog-to-digital converter, said comparator circuit receiving said input signal, a comparator discriminator also receiving said input signal, an auxiliary trial-and-error circuit to which is transmitted the output signal of said comparator-discriminator, said auxiliary trial-and-error circuit producing a voltage output in the form of an analog voltage which changes in amplitude by a pre-selected value for each said signal pulse and a digital output the voltage of which is a multibit off-on voltage and digital measure of the voltage of said voltage output, said analog voltage output being transmitted to said comparator circuit, said comparator circuit also receiving the decoded quantitized level signal output of said analog-to-digital converter, and a digital adder to which is transmitted said digital output and said digital output of said analog-to-digital converter, the digital adder generating an output constituting the digital measure of the input signal, said digital measure having improved linearity with respect to said input signal.

References Cited

UNITED STATES PATENTS

| | | | |
|---|---|---|---|
| 3,124,794 | 3/1964 | Patmore | 340—347 |
| 3,192,371 | 6/1965 | Brahm | 235—183 |

MAYNARD R. WILBUR, *Primary Examiner.*

DARYL W. COOK, *Examiner.*

J. H. WALLACE, G. R. EDWARDS,
*Assistant Examiners.*